Oct. 25, 1938.    J. FLAMM    2,134,662
MEANS FOR CONTROLLING THE COOLING SYSTEM OF INTERNAL COMBUSTION ENGINES
Filed Aug. 12, 1936
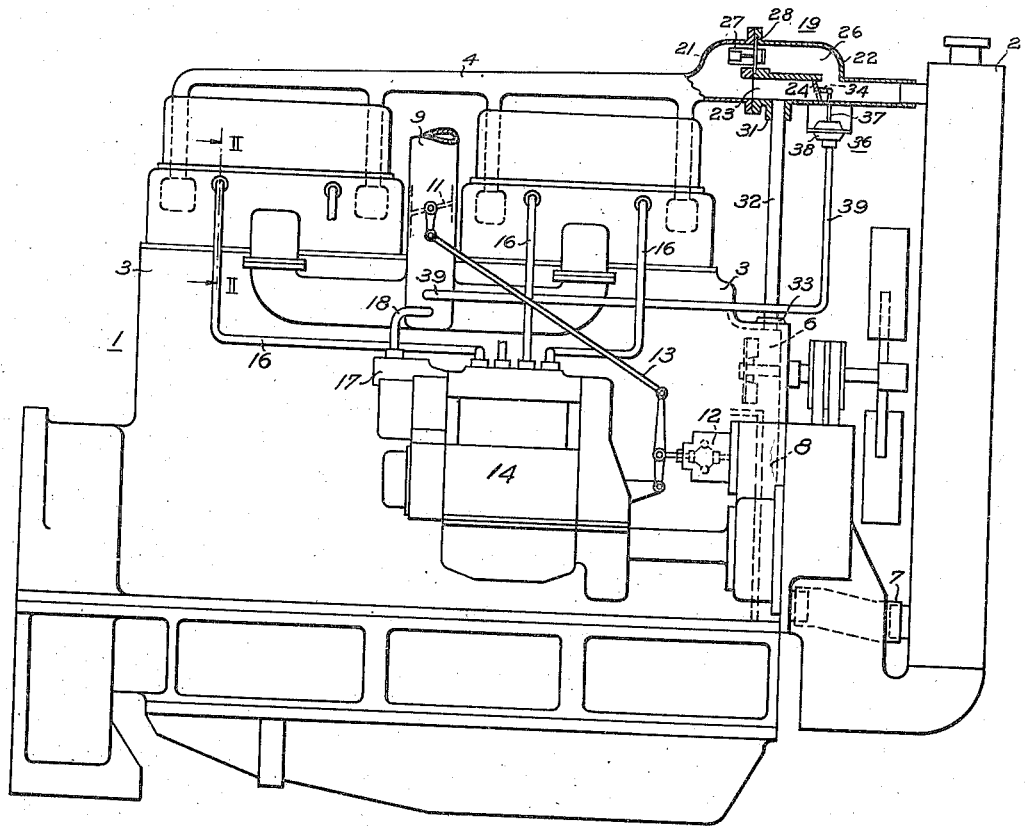
Fig. 1
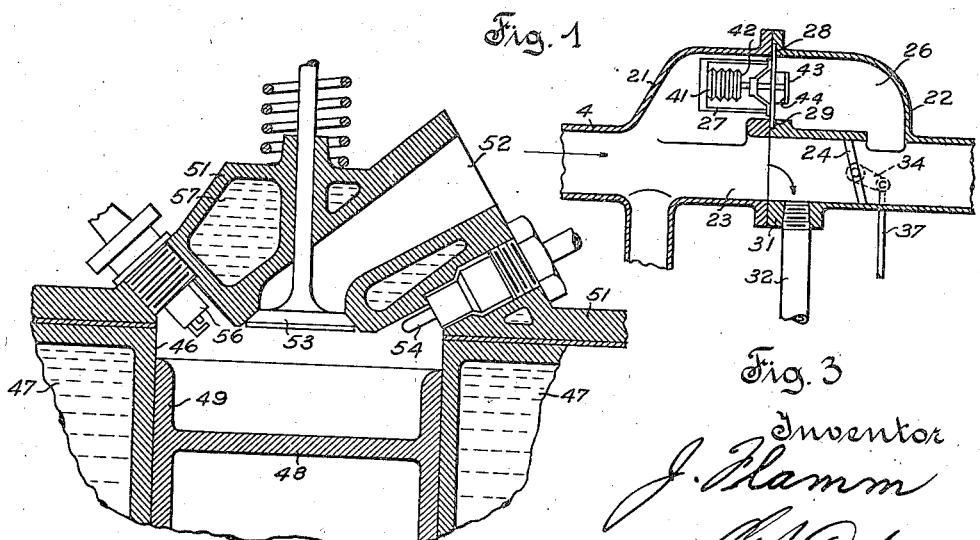
Fig. 2
Fig. 3
Inventor
J. Flamm
by
Attorney Patented Oct. 25, 1938

2,134,662

UNITED STATES PATENT OFFICE 2,134,662

MEANS FOR CONTROLLING THE COOLING SYSTEM OF INTERNAL COMBUSTION ENGINES

Joseph Flamm, West Allis, Wis., assignor to Allis-Chalmers Manufacturing Company, Milwaukee, Wis., a corporation of Delaware Application August 12, 1936, Serial No. 95,661

7 Claims. (Cl. 123—178)

This invention relates to means for controlling the temperature of internal combustion engines generally which is particularly useful in controlling the operation of low compression spark ignition engines in which the fuel oil is directly injected into the engine cylinder or combustion chamber in an atomized state for mixture with the air charge therein.

In connection with the operation of low compression engines of the spark ignition type in which relatively heavy fuel oil is directly injected in an atomized state into the combustion chamber, material difficulties have been experienced in obtaining satisfactory engine operation under light loads and while idling and these difficulties have in most instances been considered as arising either from faulty operation and/or regulation of the fuel injecting and feeding means or from an improper mixing of the fuel and air within the combustion chamber, and while the modes of feeding, injecting, regulating and mixing have all been materially improved yet these engines continued to miss when operating under light loads and while idling which produces a smoky exhaust and a material decrease in efficiency.

Also, prior arrangements have been utilized which employ a thermostatic valve and a by-pass about the radiator in order to maintain the engine at a uniform temperature under all loads and while these arrangements have proven satisfactory in connection with the ordinary gasoline engine for which they were originally designed and in which a mixture of air and vaporized fuel, which is substantially a gas, is admitted to the engine cylinder, their application to low compression engines of the solid injection spark ignition type has not prevented these engines from missing when operating under light loads or while idling.

Recent experiments have shown that in low compression engines of the solid injection type, the formation of a readily ignitible mixture from relatively heavy and non-volatile fuels is dependent not only on the proper regulation and atomization of the injected fuel, but also upon the combustion chamber temperature since a readily ignitible and combustible mixture is not formed unless the particles or globules of fuel resulting from atomization are vaporized and that improper operation under light loads and while idling is due to the fact that the temperature of the combustion chamber while sufficiently high to easily vaporize the injected fuel when the engine is operating under a material load, decreases below the vaporizing temperature due to the excessive cooling action when the engine is idling or operating under relatively light loads.

Consequently, in order to avoid the aforementioned difficulties, means must be provided which will enable the engine to be controlled in such a manner as to retain the temperature of the combustion chamber and/or air charge at a value which will readily vaporize the injected fuel during engine operation under light loads and while idling.

Therefore an object of this invention is to provide a novel means for controlling the temperature of a heat conducting or conveying fluid which is passed in heat exchanging relationship with the heated portions of an engine.

Another object is to provide a novel means for regulating and controlling the circulation and the temperature of the engine cooling fluid so as to retain the temperature of the combustion chamber and/or air charge above that required to vaporize the injected fuel under all conditions of engine operation.

A further object is to provide a novel arrangement of parts which is durable and easy to manufacture and install.

The invention accordingly consists of the various features of construction, combinations of elements and arrangement of parts as more particularly pointed out in the appended claims and in the detailed description, reference being had to the accompanying drawing, in which:

Fig. 1 is a diagrammatic view of an engine embodying the disclosed invention;

Fig. 2 is a sectional view of an engine cylinder showing the arrangement of the chambers through which the heat conveying fluid circulates; and Fig. 3 is a detailed sectional view of the unit controlling the flow of the heat conveying fluid.

Referring to Fig. 1, I denotes an internal combustion engine of the low compression, solid injection, spark ignition type having a heat exchanging or radiating device 2 communicating at its upper end with the fluid chambers in the engine cylinders 3 by a connecting means 4 and at its lower end with the water circulating pump 6 by means of the pipe 7 and passage 8, an intake manifold 9 having the usual throttle valve 11 therein which is operatively associated with a well known form of speed responsive governor 12 by means of linkage 13 so that the position of the valve conforms with the engine load and speed, and a known form of fuel pumping unit 14 delivering measured quantities of fuel to the respective engine cylinders by means of pipes 16 is operatively associated with a vacuum responsive controlling device 17 which is connected to the intake manifold 9 on the engine side of the throttle valve 11 by a pipe 18 so that the pumping action is varied in accordance with the load requirements as exemplified by the pressure within the intake manifold.

The means 4 connecting the fluid chambers in the engine cylinders with the radiating or heat exchanging device 2 comprises, as seen in Figs. 1 and 3, a member 19 formed with separable, complementary parts 21 and 22 and having a main passage 23, a valve 24 therein for controlling the passage of fluid therethrough, a passage 26 by-passing said valve, a thermostatic valve 27 having a peripheral flange 28 received in a recess 29 formed by complementary recesses in the abutting faces of the complementary parts 21 and 22 is thereby operatively positioned to control the passage of fluid through the passage 26 and a connection 31 on the engine side of the valve 24 to the main passage 23 places said passage in communication with the inlet to the pump 6 by means of a flexible pipe or hose 32 and the connection 33 on the pump housing; the arrangement being such that a limited amount of fluid is continuously circulated through this by-pass about the radiator during engine operation regardless of the positions of the valves 24 and 27. The complementary parts 21 and 22 forming the member 19 are detachably held together by any well known means, such as bolts, not shown.

The valve 24 has an actuating arm or lever 34 operatively connected with a vacuum responsive device 36 by means of link 37; said device comprising a casing 38 in which is positioned a biased diaphragm or an equivalent means which is subjected on one side to the vacuum within the intake manifold on the engine side of the throttle valve 11 by means of pipe 39 with its other side exposed to the atmosphere so that variations in vacuum within the intake manifold will cause a corresponding movement of the valve 24. The arrangement is such that upon a decrease in engine load and movement of the throttle valve 11 towards closed position, the resulting increase in vacuum will correspondingly move the valve 24 towards its closed position so that the rate of flow of the heat conveying fluid through the main passage 23 and to the radiator is proportional to the engine load; the valve 24 being completely closed during engine operation under relatively light loads and while idling. However, while it is preferred that the movement of valve 24 be directly proportional to changes in load, the relative movement may be varied to conform with the engine design and particular requirements and in some installations it may be preferable to have the valve movement directly proportional to changes in engine load only when the load is less than a predetermined value of load, for example, half load.

The thermostatic valve 27 is generally speaking, of known construction and employs a sylphon bellows arrangement 41 fixed at one end with its free end 42 carrying the valve 43 which coacts with the seat 44 to control the flow of fluid therethrough. This valve is positioned so as to be responsive to the temperature of the fluid in the passage 23 on the engine side of valve 24 and is set to open when the fluid temperature is from 175° to 190° F. depending upon the particular engine design and the volatility of the fuel employed.

It should be borne in mind that while the complementary part 21 of member 19 is shown as including the water manifold which communicates with the individual engine cylinders, it is entirely unnecessary that the manifold be included as a part thereof as the member 19 can obviously be constructed as a relatively small unit for insertion between the water manifold and the radiator and connected thereto by means of short pieces of hose or other detachable connecting means.

Referring to Fig. 2, the engine cylinder 46 is surrounded by a cooling fluid chamber 47 and has mounted for reciprocation therein the piston 48 having a cup-shaped head 49. The cylinder head 51 has streamlined inlet and exhaust passages 52 formed therein, only one of which is shown, controlled by suitable valves 53. An injection nozzle 54 extends through the head 51 at an angle to the axis of the piston and is designed to completely impregnate the entire air charge confined within the piston cup with finely atomized fuel when the piston is near its top dead center position. Opposite the injection nozzle 54 is a spark plug 56 similarly positioned in the cylinder head which is cored and bored to provide cooling fluid chambers 57 surrounding the spark plug, the injection nozzle and the inlet and exhaust passages and which are in communication with the upper portion of the chamber 47 surrounding the cylinder. The fluid discharged by the pump enters the chambers 47 adjacent their lower ends, passes upwardly therethrough into the chambers 57 in the cylinder head and outwardly therefrom towards the radiator to be recirculated with or without cooling depending upon the positions of the previously described valves. It should be understood that, in accordance with the common practice, the inlets and exits from the various fluid chambers are so arranged that the flow and distribution of the heat conveying fluid is uniform throughout the engine in order to prevent the formation of hot spots.

The formation and ignition of a combustible charge in a low compression engine of this type is briefly as follows. On the intake stroke, air is drawn into the cylinder as the piston moves downwardly, the inlet valve closing about the time the piston starts its upward movement and the air is compressed. As the piston approaches its top dead center position fuel injection takes place during an interval of about five thousands of a second and at or after the termination of injection and before the piston reaches top dead center ignition takes place. The compression temperature of the air charge is always below the ignition temperature of the injected fuel and is above the oil vaporizing temperature when the engine is materially loaded, but due to the greater cooling action during light load operation and while idling, the temperature of the cylinder walls decreases to such an extent that the compression temperature of the air charge is insufficient to vaporize the injected fuel and the resultant mixture is difficult to ignite.

Although the previously described and the preferred arrangement utilizes a valve responsive to the vacuum within the intake manifold for controlling the rate at which the heat conductive fluid passes in heat exchanging relationship to the combustion chamber and/or air charge, it is obvious that this valve may be made responsive to other conditions which vary or are varied in accordance with changes in engine load. For example, it is a common expedient to regulate low compression internal combustion engines of the heavy oil, solid injection type either by employing a speed responsive governor for controlling the position of the air throttle valve and/or the rate of fuel injection or by utilizing a speed responsive governor in connection with a device responsive to the vacuum within the intake manifold for controlling the position of the air throttle valve and the rate of fuel injection and, since the engine speed is a function of the load, the rate of air flow and of fuel injection may also be considered as varying in accordance with changes in engine load. Consequently, it is readily seen that the operator for the aforementioned valve could be made responsive to either the rate of fuel injection or the rate of air flow.

In this connection, attention is directed to the fact that the use of a vacuum responsive device for controlling the rate of fuel injection or air flow is predicated upon tests which clearly show that the degree of vacuum within the intake manifold is determined by the position of the throttle valve and the engine speed and since the position of the throttle valve and the engine speed also determines the rate of air flow through the manifold, the manifold vacuum is necessarily an accurate measure of the rate of air flow through the manifold. Moreover, since in order to obtain a proper fuel air mixture, the quantity of fuel injected must be proportional to the air charge which varies in accordance with the rate of air flow through the manifold, the manifold vacuum is also an accurate measure of the proper rate of fuel injection. Consequently, the ordinates of the substantially hyperbolic curve obtained by plotting inches of vacuum as abscissa against the position or the degree of opening of the throttle valve as ordinates may be made to represent either fuel or air quantities. Accordingly, it is readily seen that in installations in which the rate of air flow and fuel injection are controlled in accordance with variations in the engine load, the operator for the previously mentioned valve, although directly responsive to the vacuum within the intake manifold, may be considered as being in effect responsive to the rate of air flow and/or fuel injection. It should be obvious however that the valve 24 could be operated in accordance with applicant's invention by means other than that specifically set forth herein.

It should be also understood that although the invention is disclosed in connection with a vehicle engine of the solid injection type having a radiating or heat exchanging device through which the heat conveying fluid is recirculated, it is obvious that the invention is applicable to engines generally and to stationary installations in which the temperature of the heat conveying fluid and/or its rate of flow to and in heat exchanging relationship with the engine are regulated or controlled by means separate from and independent of the engine; the fluid in such installations after passing through the engine is either wasted or used in connection with other apparatus requiring a heated fluid.

The operation of an engine incorporating the disclosed invention is as follows. Assuming that the engine is operating under full load conditions, the manifold throttle valve 11 will be fully opened, the maximum quantity of fuel will be introduced into the combustion chamber at a predetermined point in the engine cycle, the vacuum responsive valve 24 controlling the passage of the heat conveying fluid from the engine to the radiator will be fully opened, the thermostatic valve 27 in the by-pass about the vacuum responsive valve 24 will be closed and the heat conveying fluid will pass from the engine through the radiator and the by-pass pipe 32 and back to the engine; the full load position of the vacuum responsive valve being such that the temperature of the heat conveying fluid during full load operation will be sufficiently high to maintain the air charge drawn into the combustion chamber at an oil vaporizing temperature. It should be understood however that the full load temperature of the fluid must conform with the particular engine design and the vaporizing temperature of the particular oil that is selected for use and in practice this temperature has been found to range from approximately 145° to 160° F. Consequently, the full load position of the vacuum responsive valve 24 must be such as to maintain the fluid at the proper temperature as determined by a consideration of the aforementioned factors.

Upon a decrease in the engine load, the speed responsive governor 12 will immediately actuate the manifold throttle valve 11 towards its closed position which will decrease the air charge introduced into the combustion chamber and as a result the vacuum in the intake manifold will immediately increase and actuate the vacuum responsive devices 17 and 36 to cause a decrease in the rate of fuel injection and movement of the valve 24 towards closed position, thereby decreasing the rate of circulation of the heat conveying fluid through the heat exchanging device; the arrangement being such that the vacuum responsive valve 24 is fully closed when the engine is operating under extremely light loads and while idling. The closing of the aforementioned valve simultaneously and proportionately with decreases in engine load will cause the temperature of the heat conductive fluid to increase as the load decreases so as to always maintain the temperature of the fluid at a value which will maintain the air charge at an oil vaporizing temperature for all engine loads. The maximum temperature of the heat conductive fluid during light load and idling operation, which is controlled by the setting of the thermostatic valve, must conform with the particular engine design and the vaporizing temperature of the oil selected for use; the usual range of variation in temperature being approximately from 175° to 190° F.

The use of a load responsive valve for controlling the passage of the heat conductive fluid in heat exchanging relationship with the air charge and/or the heated portions of the engine, enables the engine temperature to be varied substantially simultaneously with variations in engine load, whereas with the use of plurality of ordinary thermostatic valves in place of the load responsive valve 24, for accomplishing the same result, a considerable lag will aways be experienced before corrections for changes in load will be made since the temperature of the heat conductive fluid does not vary immediately in response to changes in load. Consequently, if thermostatic control valves are utilized and the engine is operating under full load and the load is suddenly reduced, a considerable amount of fluid at a temperature ranging from approximately 145° to 160° F. will continue to pass in heat exchanging relationship with the air charge and as a result the temperature of the air charge will decrease below the oil vaporizing temperature, thus producing an improper fuel air mixture which is difficult to ignite and will cause missing of the engine. Undesirable conditions will also occur with the use of thermostatic valves upon a sudden change from no load to full load operation since under these conditions, the engine would be required to operate for a time at an excessive temperature which would correspond to an overheated condition causing preignition and a mtaerial decrease in full load efficiency.

Moreover, the use of a load responsive valve in connection with the by-pass about the same having therein a normally closed thermostatic valve enables the temperature of the heat conductive fluid to be varied inversely with variations in engine load without danger of overheating the engine when there is a sudden change from no load to full load operation since an immediate increase in the quantity of fluid which passes in heat exchanging relationship with the engine will result and in addition, its temperature will be immediately reduced since fluid will be drawn from the radiator at a temperature materially lower than that of the fluid which has been circulating through the engine under no load conditions by means of the by-pass about the radiator.

In addition, this arrangement affords a simple durable means that is sensible to the slightest changes in engine load and enables the rate at which the heat conveying fluid passes in heat exchanging relationship with the combustion chamber and/or air charge to be varied simultaneously and its temperature to be varied inversely with variations in engine load.

Furthermore, this arrangement makes it possible for the ordinary heat conductive fluid, which is generally employed solely as a cooling means for the heated portions of the engine, to perform the additional function of preventing the dissipation of heat from the engine during operation under light loads and while idling which is essential for the satisfactory operation of low compression solid injection engines having timed injection and ignition of the fuel charges.

It should be understood that it is not desired to limit the invention to the exact details of construction and operation herein shown and described for various modifications within the scope of the claims may occur to persons skilled in the art.

It is claimed and desired to secure by Letters Patent:

1. A device for use in the circulatory cooling system of an internal combustion engine comprising a unitary member having a main passage, means providing connections for placing one end portion of said passage in communication with the cooling fluid chamber of an engine and the other end portion in communication with a radiator, a valve in said main passage operable when the engine is running and irrespective of the temperature of the cooling fluid to vary the quantity of the fluid passing therethrough in accordance with changes in engine load, a secondary passage by-passing said valve and communicating with said main passage at points intermediate the said end portions and a thermostatic valve in said by-pass operable to open only when the temperature of the fluid approaches a value consistent with satisfactory no load operation.

2. A device for use in the circulatory cooling system of an internal combustion engine comprising a unitary member formed with separable, complementary parts and having a main passage, a valve in said main passage operable when the engine is running and irrespective of the temperature of the cooling fluid to vary the quantity of the fluid passing therethrough in accordance with changes in engine load, a secondary passage by-passing said valve and communicating with said passage at points intermediate the said end portions and a thermostatic valve operable to open only when the temperature of the fluid approaches a value consistent with satisfactory no load operation operatively positioned to control the by-pass passage by said complementary parts.

3. In combination, an internal combustion engine having a circulatory cooling system including a heat exchanging device, means directly controlling the flow of the fluid through said device comprising a normally closed thermostatic valve operative to open only when the water temperature reaches the maximum value consistent with satisfactory no load operation, a second valve independent of said thermostatic valve and means responsive to and variable with changes in load throughout the operating range of the engine and operatively associated with said second valve so that whenever the load is suddenly reduced to no load conditions the flow of fluid past said second valve and through said device immediately ceases.

4. In a combination comprising an internal combustion engine having a circulatory cooling system including a heat exchanging device, means directly connecting the device with the engine jacket including two fluid passages arranged in parallel, flow controlling means comprising a normally closed thermostatic valve operative to open only when the water temperature reaches the maximum value consistent with satisfactory no load operation, a second valve independent of said thermostatic valve, and means responsive to and variable in accordance with changes in load throughout the operating load of the engine connected with the second valve for rendering the latter operable at all times when the engine is operating under load to vary the flow of fluid through said device in accordance with changes in engine load irrespective of the temperature of the fluid.

5. In combination with an internal combustion engine having a fluid chamber in heat exchanging relationship with the heated portions of the engine, a heat exchanging device, and means for circulating the fluid through said chamber and device, means operable irrespective of the temperature of the cooling fluid when the engine is operating under load for varying the quantity of fluid passing through the heat exchanging device in accordance with changes in engine load and, when the engine is operating under no load conditions, for passing the cooling fluid through the heat exchanging device only when the temperature of the fluid reaches the maximum value consistent with satisfactory no load operation comprising flow controlling mechanism in the conduit directly connecting said chamber and device responsive to a condition which varies substantially simultaneously with changes in engine load and a by-pass operative to conduct the fluid to said device independent of said mechanism including a normally closed thermostatic valve operable to open only when the temperature of the fluid reaches the maximum no load value.

6. In combination with an internal combustion engine having a fluid chamber in heat exchanging relationship with the heated portions of the engine, a heat exchanging device, means for circulating the fluid through said chamber and device, and a by-pass about the heat exchanging device, means operable irrespective of the temperature of the cooling fluid when the engine is operating under load for varying the quantity of fluid passing through the heat exchanging device in accordance with changes in engine load and, when the engine is operating under no load conditions, for passing the cooling fluid through the heat exchanging device only when the temperature of the fluid reaches the maximum value consistent with satisfactory no load operation comprising flow controlling mechanism in the conduit for passing heated fluid directly from said chamber to said device at a point intermediate said by-pass and device which is responsive to a condition that varies substantially simultaneously with changes in engine load and a by-pass operative to conduct the heated fluid to said device independent of said mechanism including a normally closed thermostatic valve operable to open only when the temperature of the fluid reaches the maximum no load value.

7. In combination with an internal combustion engine having a circulatory cooling system including a heat exchanging device, means operable irrespective of the temperature of the cooling fluid when the engine is operating under load for varying the quantity of fluid passing through the heat exchanging device in accordance with changes in engine load and, when the engine is operating under no load conditions, for passing the cooling fluid through the heat exchanging device only when the temperature of fluid approaches a value consistent with satisfactory no load operation comprising flow controlling mechanism in the conduit leading to said device which is responsive to a condition that varies with changes in engine load and a passage operative to conduct the fluid to said device independent of said mechanism including temperature responsive flow controlling means operable to pass fluid to said device only when the temperature of the fluid approaches a value consistent with satisfactory no load operation.

JOSEPH FLAMM.

CERTIFICATE OF CORRECTION.

Patent No. 2,134,662. October 25, 1938.

JOSEPH FLAMM.

It is hereby certified that error appears in the printed specification of the above numbered patent requiring correction as follows: Page 4, second column, line 47, claim 4, after the word "load" insert range; and that the said Letters Patent should be read with this correction therein that the same may conform to the record of the case in the Patent Office.

Signed and sealed this 13th day of December, A. D. 1938.

Henry Van Arsdale (Seal) Acting Commissioner of Patents.